(12) United States Patent
Benz et al.

(10) Patent No.: US 7,958,610 B2
(45) Date of Patent: Jun. 14, 2011

(54) REPAIR AND RESURFACING METHODS FOR USE IN REMANUFACTURING A MACHINE SYSTEM

(75) Inventors: Eric Benz, Peoria, IL (US); Robert Sharp, Corinth, MS (US); Leslie Caviness, Ripley, MS (US); Casey Borden, Corinth, MS (US); Bobby McDaniel, Corinth, MS (US)

(73) Assignee: Caterpillar Inc., Peoria, IL (US)

( * ) Notice: Subject to any disclaimer, the term of this patent is extended or adjusted under 35 U.S.C. 154(b) by 1004 days.

(21) Appl. No.: 11/827,241

(22) Filed: Jul. 11, 2007

(65) Prior Publication Data
US 2009/0013517 A1    Jan. 15, 2009

(51) Int. Cl.
*B23P 19/04*    (2006.01)
(52) U.S. Cl. .................................................. 29/402.04
(58) Field of Classification Search ............... 29/402.04, 29/402.03, 402.01, 402.05, 402.06, 402.07, 29/402.09, 402.18, 402.19, 402.21, 404, 29/405, 458, 459, 402.13; 126/625; 123/193.2
See application file for complete search history.

(56) References Cited

U.S. PATENT DOCUMENTS

| | | | |
|---|---|---|---|
| 3,857,553 A * | 12/1974 | Griffiths | ........................ 266/252 |
| 4,153,983 A | 5/1979 | Stockton | |
| 4,486,938 A | 12/1984 | Hext | |
| 4,953,777 A | 9/1990 | Griffith et al. | |
| 5,201,455 A | 4/1993 | Reynolds, Jr. et al. | |
| 5,268,045 A | 12/1993 | Clare | |
| 5,691,004 A | 11/1997 | Palazzolo et al. | |
| 5,915,743 A | 6/1999 | Palma | |
| 5,956,845 A | 9/1999 | Arnold | |
| 6,258,402 B1 | 7/2001 | Hussary et al. | |
| 6,274,193 B1 | 8/2001 | Rigney et al. | |
| 6,622,685 B2 | 9/2003 | Takahashi et al. | |

FOREIGN PATENT DOCUMENTS
EP    0 716 158    12/1996
* cited by examiner

*Primary Examiner* — John C Hong
*(74) Attorney, Agent, or Firm* — Liell & McNeil

(57) ABSTRACT

A method of repairing a housing for a machine system includes returning an inner diameter of at least one bearing bore of the housing to a uniform diameter state. The at least one bearing bore is prepared for resurfacing via removing deeply entrapped grease from within pores in cast surface material of the housing subsequent to returning the inner diameter to a uniform diameter state. Subsequent to preparing the at least one bearing bore for resurfacing, it is resurfaced with a material different from cast material of the housing and bonded therewith, for example via thermal spray coating. Resurfacing a cast metallic component, of iron, steel, or the like with metal spray coating may include removing deeply embedded grease from pores of cast surface material of a cast component, in preparation for spraying the cast component with metal spray resurfacing material.

20 Claims, 3 Drawing Sheets

REPAIR AND RESURFACING METHODS FOR USE IN REMANUFACTURING A MACHINE SYSTEM

TECHNICAL FIELD

The present disclosure relates generally to repairing machine system components via resurfacing, and relates more particularly to repair and remanufacturing via metal spray deposition of resurfacing material onto prepared bearing bores in a housing.

BACKGROUND

The fields of machine system salvaging and remanufacturing have grown rapidly in recent years. Systems and components that only recently would have been considered scrap are now rebuilt, refurbished, etc., and returned to service. A wide variety of repair-related technologies has accompanied expansion of these fields. In the past, it was common for a "rebuilt" machine system such as an engine to be returned to service only after its dimensions, operating characteristics, etc. had been modified from original specs. It is now increasingly common for systems and components to be remanufactured to a condition as good as new. The development of repair and remanufacturing strategies in certain technical areas has been rapid. In other areas, however, and in the case of certain specific parts, engineers have found it more challenging to return components to a commercially and technically acceptable state, much less a condition identical to that held in a former service life.

The repair and rebuilding of certain parts commonly used in locomotives is one area where improved repair strategies would be welcomed. One component of interest is known in the art as a bearing taper roller or "BTR" housing. BTR housings are used in locomotive systems to support traction motors for applying driving torque to axles/wheels of the locomotive. A set of bearings are typically positioned between a locomotive axle and the BTR housing to rotatably journal the axle therein. Application of driving force from electric motors on the axle, typically via a gearbox, tends to eventually result in problematic wear to portions of the BTR housing. This wear is apparently due at least in part to separating forces between drive gears in the propulsion system. When certain locomotive subassemblies are disassembled for remanufacturing, it is typically desirable to repair the wear on one or more BTR housings if they are otherwise suited to returning to service. Wear problems have been shown to be especially acute in regions of BTR housings supporting the bearings that journal the locomotive axle.

The bearings used to rotatably journal axles within BTR housings typically consist of taper ring bearing assemblies pressed or shrink fitted into bores at opposite ends of the BTR housing. Over the course of many hours of operation, the aforementioned forces have a tendency to create worn regions within the bearing bores. This type of wear often develops asymmetrically within the bearing bores due to the asymmetric nature of the forces responsible therefor. A consequence of overly worn bearing bores can be uneven stress and strain on components, and potentially premature fatigue or failure.

To address these issues, technicians have previously placed sleeves and the like into the bearing bores to support replacement bearings therein. It is typically quite difficult or impossible to remanufacture the BTR housing a second time, however, where this strategy is used. Reversing the connections between the parts is difficult. Furthermore, one or both of the process of engaging the sleeve in the bearing bore, and removing it, can deform or otherwise alter the housing and/or bearing bores such that they are poorly suited to receiving and supporting such sleeves in a second round of remanufacturing. Other attempts at repairing bearing bores in BTR housings have included the application of resurfacing material. These techniques have not met with success due to the tendency for residual grease within the bore to interfere with adhesion of resurfacing material.

SUMMARY OF THE DISCLOSURE

The present disclosure provides a method of repairing a housing for a machine system. The method includes receiving a housing removed from service in a machine system that includes at least one bearing bore having a non-uniform inner diameter. The method further includes returning the inner diameter of the at least one bearing bore to a uniform diameter state, and subsequent to returning the inner diameter to a uniform diameter state, removing deeply entrapped grease from cast material of the housing. The method further includes, subsequent to removing deeply entrapped grease, resurfacing the at least one bearing bore with a material different from cast material of the housing and bonded therewith.

The present disclosure also provides a method of remanufacturing a machine system, including removing surface material from within at least one bearing bore of a housing for a machine system. The method further includes, subsequent to removing surface material, removing deeply entrapped grease from cast material of the housing, and subsequent to removing deeply entrapped grease, resurfacing the at least one bearing bore by adding material different from cast material of the housing and bonded therewith. The method still further includes shipping the housing for returning to service in a machine system, subsequent to resurfacing the at least one bearing bore.

The present disclosure also provides a method of resurfacing a cast metallic component with metal spray coating. The method includes removing external grease present on a surface of the cast metallic component, and removing grease deeply entrapped in pores of the surface of the cast metallic component. The method still further includes spraying the surface of the cast metallic component with metal spray resurfacing material to bond the resurfacing material therewith, and machining the metal spray to restore the component to original specifications.

DETAILED DESCRIPTION

Figure 1:
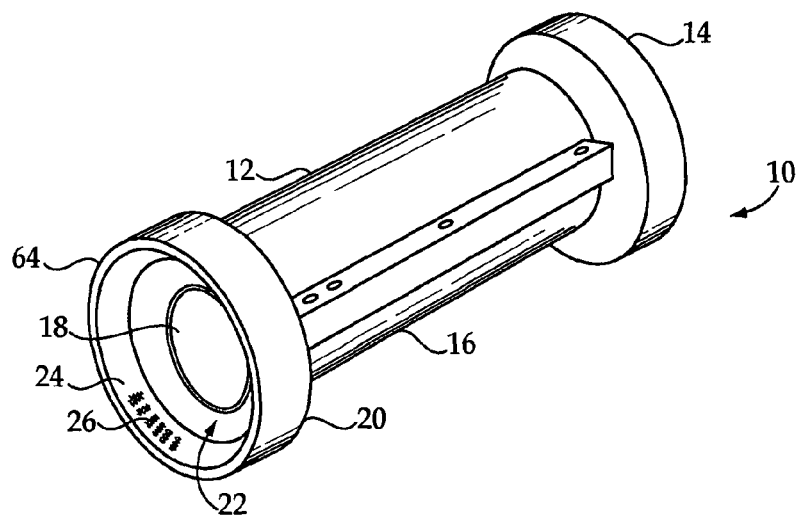
FIG. 1 is an isometric view of a housing for a machine system.

Referring to FIG. 1, there is shown a housing 10 for a machine system. Housing 10 may comprise a machine housing removed from service in a machine system, typically when the machine system is disassembled for remanufacturing, repairs or other servicing. Housing 10 may be configured to receive and support an axle, shaft or the like, as described herein. Housing 10 will typically consist of a one-piece component, formed via casting from iron, steel or the like, but could be a multi-piece component, or formed from other materials. Properties common to many cast materials will make certain cast components amenable to repair and/or remanufacturing according to the teachings set forth herein. In particular, pores in cast surface material of cast components may have a tendency to entrap grease deeply therein. Certain repair techniques for cast machine components relating to the application of resurfacing material have heretofore been impossible, or at least prohibitively difficult and/or expensive, due to the tendency for entrapped grease to interfere with adhesion of the resurfacing material. The present disclosure addresses these problems. In particular, the repair, remanufacturing and resurfacing processes of the present disclosure are considered superior to the state of the art for certain components and types of machine systems.

In one embodiment, housing 10 may be of the type known in the art as a "BTR" housing, used in locomotive combo assemblies to support one or more traction motors for propelling the locomotive. As will be further apparent from the following description, however, the present disclosure is not limited to machine components and systems of any specific type. The present disclosure is contemplated to be applicable to a wide variety of cast machine components in the contexts of repair, remanufacturing and resurfacing, and could even be utilized in the preparation of new cast parts if grease or oil entrapped within pores of the cast material is of concern.

Housing 10 may include a center portion 12 having mounting structures 16 thereon, and includes a first end portion 14 and a second end portion 20. Housing 10 may be comprised entirely of a cast material 64, but might also include other materials. A first bore 18 extends through center portion 12 and is configured to receive an axle. A second bore 22 connects with bore 18 and comprises a bearing bore 22 configured to receive a bearing for rotatably journaling an axle extending in bore 18. End portion 14 may also include a bearing bore connecting with bore 18, not visible in FIG. 1. Each of the bearing bores in end portions 20 and 14 may have inner diameters, further described herein, which are defined by cast material 64. The respective inner diameters of the bearing bores in end portions 20 and 14 may consist of cast surface material of housing 10, typically having relatively greater porosity than cast internal material, the significance of which will be apparent from the following description.

A plurality of wear regions 26, or frets, are located on an inner diameter 24 of bore 22. In the case of BTR housings, wear regions 26 will typically form predominantly on only a portion of inner diameter 24, and tend to result from uneven forces on a bearing race fitted within bore 22, further described herein. In other words, wear regions 26 tend not to develop uniformly about inner diameter 24, due to forces applied to an axle extending within housing 10. As a traction motor rotates an axle within housing 10, the forces experienced by bearings journaling the axle can be asymmetric with respect to a periphery of the bearing, and hence asymmetric about inner diameter 24. In any event, fretting from slipping of a bearing race with respect to inner diameter 24 has been shown to result in an oblong axial cross section of bore 22, rather than a circular axial cross section. This type of wear can ultimately require repair if housing 10 is to be returned to service.

Figure 2:
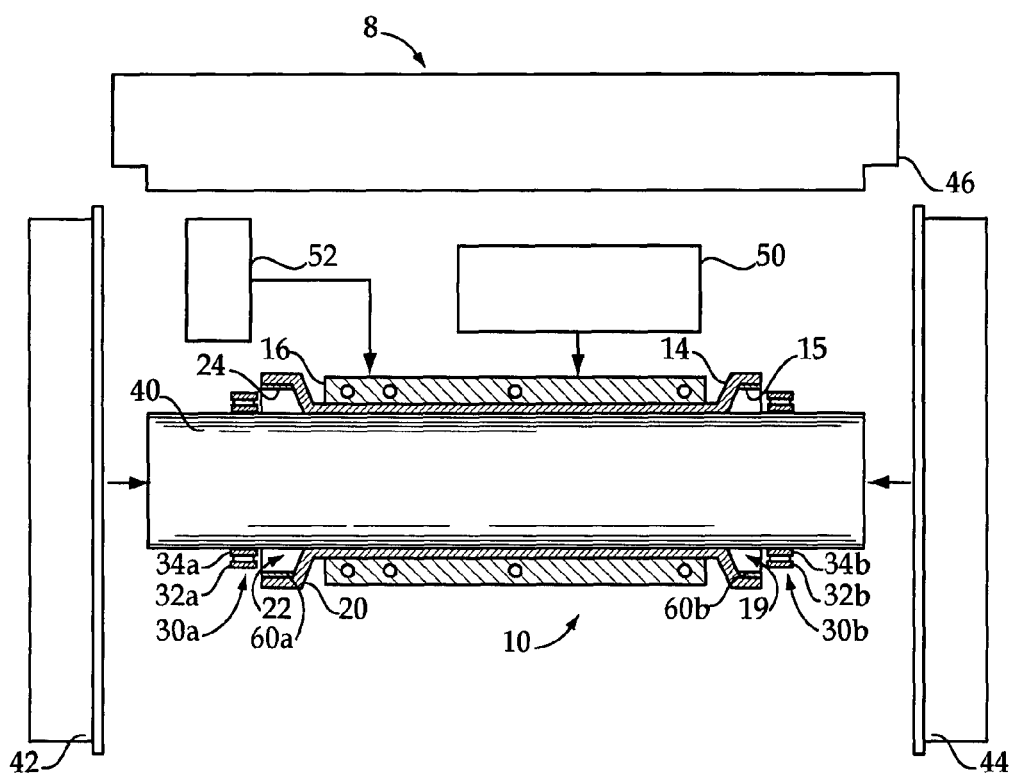
FIG. 2 is a partially sectioned diagrammatic view of a disassembled machine system.

Referring also to FIG. 2, there is shown a machine system 8 of which housing 10 may be a part, illustrated with certain of its components disassembled. System 8 includes a frame 46 such as a locomotive frame or portion thereof, to which certain of the other components of system 8 may be attached. System 8 may further include a first wheel 42 and a second wheel 44, each of which are configured to couple with an axle 40 extending through housing 10. A first bearing 30a, having an outer race 32a and an inner race 34a, is positionable about axle 40 and configured to rotatably journal axle 40 at a position adjacent one end of housing 10. A second bearing 30b is provided, also having an outer race 32b and an inner race 34b, and configured to rotatably journal axle 40 at a position adjacent an opposite end of housing 10. Each of bearings 30a and 30b may have their respective outer races 32a and 32b press fit or shrink fitted within bore 22, and another bore 19 in end portion 14, respectively, when system 8 is assembled.

One or more electric motors 50 may also be provided and configured to attach to mounting structures 16 for providing motive power to one or more of wheels 42 and 44, or axle 40, via a gearbox 52, also configured to attach with housing 10 via mounting structures 16. In one embodiment, motor(s) 50 may be mounted to housing 10, and also to frame 46. In FIG. 2, housing 10 is depicted after being remanufactured, as it might appear following repair and/or resurfacing according to the processes described hereinbelow. It will be noted that a layer of resurfacing material 60a and 60b is located on inner diameters 24 and 15, respectively, of each of bores 22 and 19. Application of resurfacing material 60a and 60b can be used to repair housing 10, and otherwise restore each of bores 22 and 19 to a condition appropriate for supporting bearings 30a and 30b. Bores 22 and 19 will typically be returned to original specifications, having circular axial cross sections, via the techniques described herein. Exemplary processing techniques of the present disclosure are further described hereinbelow.

Figure 3:
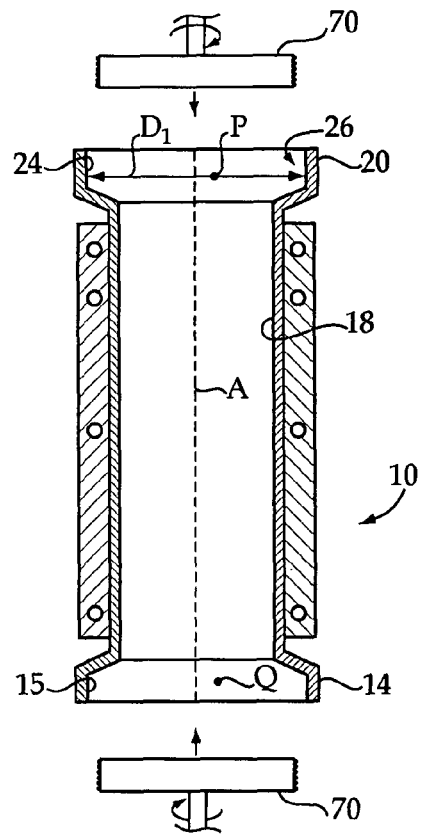
FIG. 3 is a partially sectioned side view of a housing for a machine system at a processing stage.

Referring to FIG. 3, there is shown a sectioned side view of housing 10 as it might appear after being disassembled from machine system 8 for repairing of wear regions 26. Bearings 32a and 32b have been removed, via reversing shrink/press fits with housing 10, and other components of system 8 removed. Prior to initiating repairing housing 10, it may be subjected to a preliminary cleaning and inspection process to ascertain whether some failure mode or wear issue exists other than the existence of wear regions 26. Debris and surface grease may also be removed from surfaces of housing 10 prior to initiating repair and/or remanufacturing. It should further be appreciated that housing 10 may be "repaired" via resurfacing even where wear regions 26 are not detected. In many instances, machine systems or subassemblies thereof may be remanufactured periodically, even where no failure mode is actually detected, simply because it is convenient. Alternatively, some other element of the larger system of which housing 10 is a part may be remanufactured, serviced or repaired and, hence, processing of housing 10 as described herein may be carried out as a preventative measure. In some instances, only one of bores 22 and 19 may readily exhibit undue wear, however, both might be treated as described herein as a precautionary matter. Moreover, wear regions 26 may be difficult or impossible to detect unless bearings 32a (or 32b in the case of wear within bore 19) have been removed. For these and other reasons, it may be desirable to initiate processing of housing 10 as described herein once system 8 is disassembled, regardless of whether bearing bores 22 and 19 actually appear to be worn.

It will be noted in FIG. 3 that bore 22 has a diameter $D_1$ extending across bore 22 between opposite regions of inner diameter 24, perpendicular an axis A of housing 10. The diameter $D_1$, or width, of bore 22 is greater than its depth along axis A. It may further be noted that a point P, representing an approximate center point of bore 22, is positioned slightly away from axis A. Due to the development of wear regions 26 on inner diameter 24, bore 22 may have an oblong axial cross section and, hence, its center point P may be displaced slightly from axis A of housing 10. The relative displacement between point P and axis A is somewhat exaggerated in FIG. 3 for illustrative purposes over what might actually be expected to occur. A similar phenomenon may be noted with regard to bore 19, and its approximate center point Q. Where either of bores 22 and 19 has developed an oblong axial cross section or otherwise has a non-uniform inner diameter 24 and 15, respectively, it will be desirable to return the respective inner diameter to a uniform diameter state, in preparation for application of a resurfacing material such as material 60a and 60b shown in FIG. 2.

It has been discovered that application of certain types of metallic resurfacing materials, such as the types applied via techniques known as thermal spray, metal spray, plasma spray and by similar monikers, tend to be most successful where they have a uniform thickness. In relatively rugged machine environments such as that of locomotive BTR housings, even deviations in uniformity of resurfacing material thickness on the order of several thousandths of an inch can eventually result in failure of the mechanical bond between the resurfacing material and its substrate. This contrasts with certain other uses of metal spray coatings where less exacting specifications may be acceptable, such as where a resurfacing coating does not support heavy-duty press fit or shrink fit bearing assemblies, where the coating is subjected to relatively uniform forces in service, or where the coating does not experience the force magnitudes common in locomotive and other heavy duty applications. To achieve a uniform diameter thickness of resurfacing material, it will typically be desirable to return inner diameters 24 and 15 to a uniform diameter state in advance of applying resurfacing material. In addition to an oblong axial cross section, other examples of non-uniformity of inner diameters 24 and 15 might include cracks, cavities, etc., even if the respective inner diameter still defines a generally circular axial cross section.

Returning one or more of inner diameters 24 and 15 to a uniform diameter state may include removing surface material from within the corresponding bore 22 and 19, respectively. Removing surface material from bores 22 and 15 may thus enlarge the corresponding bore relative to a specification diameter, e.g. $D_1$. Where housing 10 has not been remanufactured before, removing surface material may consist of removing cast surface material. Where housing 10 has been previously remanufactured, removing surface material may consist of removing resurfacing material previously applied to inner diameters 24 and 15. In either event, one or more rotary cutting tools 70 may be used to machine bores 22 and 19, for example by dry machining, to remove surface material from therein. Due to the particular configuration and application of housing 10, it may further be desirable to true each of bores 22 and 19 to a common axis, such as axis A. Axis A will typically comprise a central axis for bore 18 of housing 10 and, hence, bores 22, 18 and 19 may all be coaxial once removal of surface material from bores 22 and 19 is complete. It should be appreciated that while bore 18 may comprise a completely enclosed passage, in other housing designs, bore 18 may be partially open, or defined by separate components, but still include an axis, to which bores 22 and 19 can be commonly trued.

Figure 4:
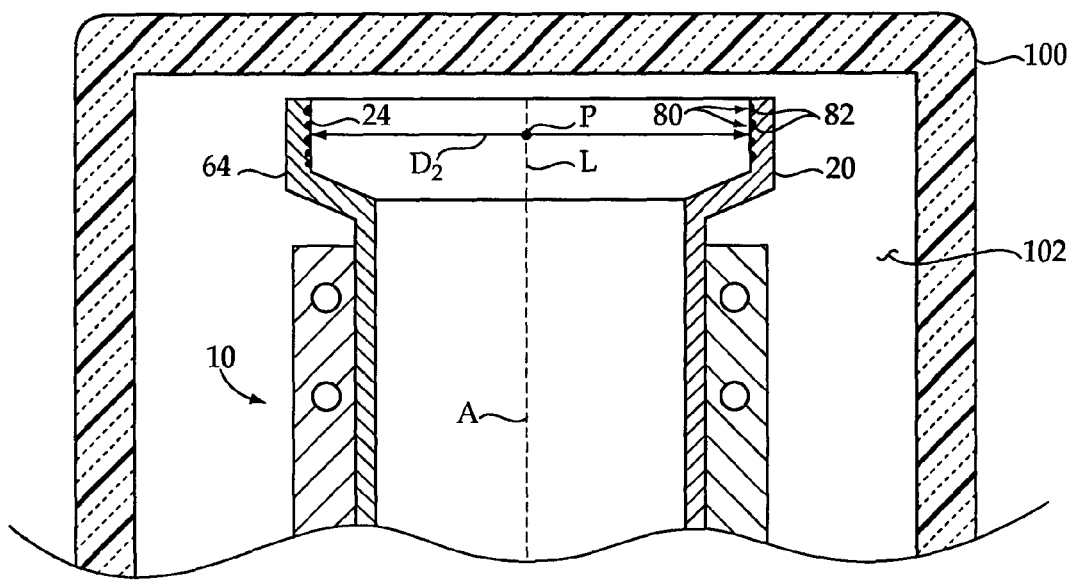
FIG. 4 is a partially sectioned side view of a portion of the housing of FIG. 3 at another processing stage.

Following removal of surface material from bores 22 and 19, further preparation for resurfacing may take place. Turning to FIG. 4, there is shown a sectioned view of a portion of housing 10. It will be noted that center point P of bore 22 intersects axis A after removal of surface material in the processing stage shown in FIG. 3. It will also be noted that bore 22 has a diameter $D_2$ which is relatively larger than the specification diameter, $D_1$, shown in FIG. 3 prior to removing surface material. The following description primarily discusses treatment/modification of bore 22; however, the description should be understood as similarly applicable to bore 19 where not specifically described. Greases typically used in machine systems such as system 8 tend to be relatively viscous. Cast material, and in particular cast surface material, of machine system components such as housing 10, tends to be relatively porous. As a result, grease used in such machine systems can become deeply entrapped within pores in cast material of the machine components. As used herein in connection with grease, the term "deeply entrapped" and similar terms should be understood as referring to grease that is trapped within pores extending in cast material, as opposed to grease adhering to surfaces, or even grease which is entrapped among features of a rough component surface.

It has long been recognized that surface grease can interfere with adhesion of coatings such as paints, metal sprays, adhesives, etc. to a substrate. Surface grease is relatively easily removed through various known processes. Adhesion issues for resurfacing material relating to grease deeply entrapped within pores of cast material, however, have presented unanticipated challenges. These challenges have been recognized as particularly acute with respect to cast components in a remanufacturing environment. In general, it is believed that heating of cast surfaces during conventional resurfacing processes can liquefy entrapped grease such that it flows out of pores in the cast material and interferes with adhesion of resurfacing material. This phenomenon appears to occur even where such components are immersed in solvents and the like prior to resurfacing, and has been demonstrated to be particularly problematic with regard to metal spray processes. Such spray processes tend to heat the substrate receiving the spray coating. In the case of cast surface material, a film of grease can develop between the resurfacing material and the cast material of the substrate. Many metal spray techniques rely primarily upon mechanical bonding of the metal spray material with the substrate and, accordingly, the lubricious properties of grease tend to interfere with successful mechanical bonding of the metal spray. It has been discovered that worn regions such as wear regions 26 may exacerbate grease entrapment as the normally relatively uniform surface is damaged, potentially closing pores wherein grease is entrapped.

A plurality of pores 80 are illustrated in FIG. 4, extending from inner diameter 24 of bore 22 and having grease 82 entrapped therein. After machining away surface material from within bore 22, as in the processing stage described with regard to FIG. 3, grease 82 remains entrapped within pores 80. The present disclosure provides a means for removing the entrapped grease 82 in preparation for resurfacing in an efficient and cost-effective manner. During the machining process depicted in FIG. 3, only so much material as is necessary to return bore 22 to a uniform diameter state and true it relative to axis A is typically removed. Removing only a relatively small amount of material, e.g. several thousandths of an inch, can enable remanufacturing of housing 10 multiple subsequent times. If too much material is removed from bore 22, the thickness of resurfacing material required to return bore 22 to specifications may exceed an acceptable thickness, actually weakening the layer of resurfacing material. Thus, while it might be possible to machine away all of the entrapped grease prior to resurfacing, this will typically not be desirable. Three general strategies are described herein which, in conjunction with the earlier described machining step, have been discovered to be effective in removing deeply entrapped grease from cast surface material of housing 10. Other techniques may be used.

In one example embodiment, housing 10 may be placed in a furnace 100 having an interior 102 whereby housing 10 may be immersed in heated fluid such as air. To avoid altering the metallurgical properties of cast material of housing 10, it will typically be desirable to heat inner diameter 24 of housing 10 uniformly to a temperature between a flow temperature of entrapped grease 82 and a metallurgical damage temperature of cast material 64 of housing 10. Uniformly heating inner diameter 24 also helps ensure that no portions thereof will be left with grease trapped therein, or experience damage from uneven heating. Techniques such as applying a torch to inner diameter 24 should not be understood as uniformly heating the same. In one embodiment, wherein housing 10 consists of cast steel, it may be heated to a temperature of about 700° F. or greater, and may be heated to a temperature in the range of about 700° F. to about 750° F. The specific metallic composition of housing 10 will typically determine the metallurgical damage temperature thereof. The temperature at which certain metallic compositions such as iron, steels, etc. irreversibly change their properties are generally known or readily available to those skilled in the metallurgical arts. Heating housing 10 as described will allow grease 82 to flow out of pores 80, and in particular will facilitate leaching out of grease 82 via solvents shortly following heating in furnace 100. In some instances, entrapped grease may be burned away. Accordingly, following heating housing 10 for a time sufficient to heat grease 82 to a temperature at which it can flow, housing 10 may be immersed in a bath or "dunker tank" of solvent suitable for dissolving grease 82. Conventional degreasing solvents known to those skilled in the relevant arts may be used. Following degreasing, it may be desirable to subject housing 10 to one of a variety of de-rusting and rust prevention treatments, similar to those described in connection with the following two alternative heating methods.

In a second example embodiment, deeply entrapped grease may be removed from housing 10 by heated via a fluidized bed. Fluidized beds are generally well known and typically include a tank filled with calibrated quartz sand that is fluidized by primary air blown in the bed from a bottom thereof via an air distribution system. A combustible gas such as natural gas is typically mixed into the air. As the mixture emerges from the sand it is ignited by a pilot burner. Burning natural gas will tend to spread out across the surface of the sand mass. Heating of the sand mass is typically controlled via controlling the flow of natural gas or the like. Due to the relatively easily controlled heating of the sand, and therefore the relatively easily controlled uniform heating of housing 10, it is relatively easy to heat housing 10 to a desired temperature range to remove deeply entrapped grease from within pores 80. The grease will typically liquefy, vaporize and then be destroyed in a post-combustion chamber of the fluidized bed system. In one specific embodiment, housing 10 may be immersed in the fluidized sand for approximately one hour at a temperature of about 750° F. Following immersion, housing 10 may be subjected to a de-rusting treatment such as via immersion in a suitable de-rusting fluid such as Houghto Strip 8991-Caustic for about thirty minutes, at a temperature of about 180° F.

In yet another embodiment, deeply entrapped grease may be removed from pores 80 of housing 10 via immersion in a molten salt bath such as a KaOH bath, for example of Kolene Salt #6, at a concentration of about 15% to 20%, and a temperature between about 700° F. and about 750° F. The overall salt bath treatment may include a plurality of stages, for example a first stage wherein housing 10 is immersed in the above bath for approximately fifteen minutes, leaching out entrapped grease. Following salt bath immersion, housing 10 may be rinsed with water or another suitable material, for instance again by immersion for about fifteen minutes. Following the rinse phase, housing 10 may be immersed in successive treatments of a rust preventative, including for example approximately fifteen minutes immersion in Prevox 505, 5% concentration, at 120° F., followed by approximately fifteen minutes immersion in Prevox 505, 2% concentration, at 120° F. Following the treatments with the rust preventative, housing 10 may be subjected to two successive fifteen minute stages of immersion treatment with a rust remover such as 75DW, 48%-58% concentration, at a temperature between about 170° F. and about 205° F. Following treatment with rust remover, housing 10 may again be treated with rust preventative, for example fifteen minutes immersion in Prevox 505, at a pH of about 9 to 13, and at a temperature of between about 110° F. and about 140° F. Finally, a further rust preventative treatment may take place, for example immersion in Prevox 505, at a concentration of about 4% to about 8%, and at a temperature of between about 110° F. and about 140° F. As alluded to above, de-rusting and rust prevention may also be used in connection with furnace heating of housing 10, as may other cleaning and processing activities.

Figure 5:
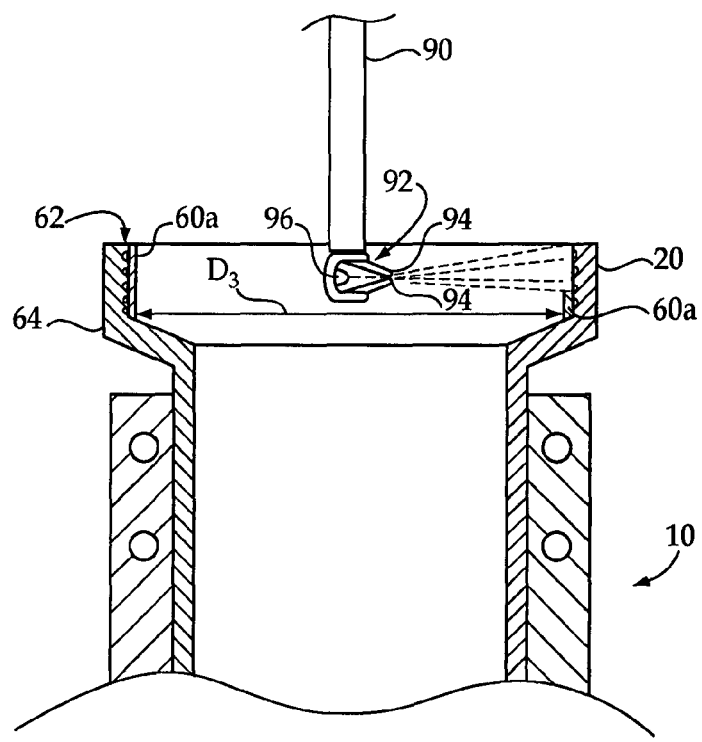
FIG. 5 is a partially sectioned side view of a portion of the housing shown in FIGS. 3 and 4 at yet another processing stage.

Subsequent to heating inner diameter 24 and removing deeply entrapped grease, inner diameter 24 may be further machined to provide a relatively rough surface to enhance metal spray adhesion. In certain embodiments, roughening of inner diameter 24 might be omitted, or it might take place prior to heating housing 10 as described. Referring to FIG. 5, there is shown housing 10 at a processing stage wherein a layer of resurfacing material 60*a* has been applied to inner diameter 24 and thus covers portions thereof. It may be noted from the FIG. 5 illustration that a uniform cylindrical boundary 62 separates resurfacing material 60*a* from cast material 64 of housing 10. A metal spray apparatus 90 may be positionable partially within bore 22, and comprises a nozzle 92, metal wires 94 and a gas outlet 96 configured to supply gas for spraying metal from vaporized wires 94 onto inner diameter 24. After application of resurfacing material 60*a*, bore 22 will typically have an inner diameter $D_3$ that is smaller than the specification diameter $D_1$.

Figure 6:
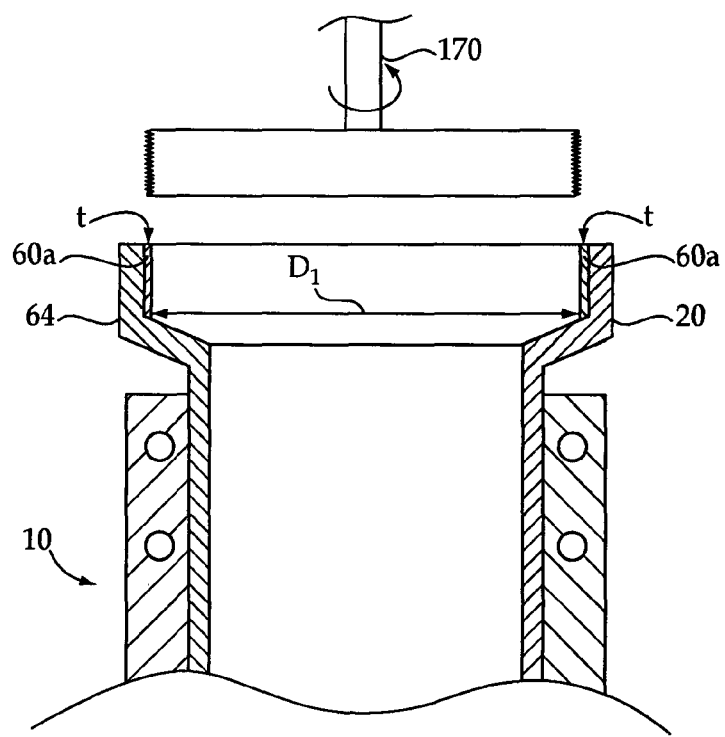
FIG. 6 is a partially sectioned side view of a portion of the housing of FIGS. 3-5 at yet another processing stage.

Referring to FIG. 6, resurfacing material 60*a* is shown having a uniform thickness t, as discussed above. Uniformity in the thickness of resurfacing material 60*a* may be achieved in part by ensuring that inner diameter 24 has a uniform diameter state, and that bore 22 has a circular axial cross section, as described above. Uniformity in thickness of resurfacing material 60*a* may be further achieved via a final machining procedure, shown in FIG. 6, again using a rotary cutting tool 170 wherein the diameter of bore 22 is increased, made cylindrical if necessary, and thereby returned to the specification diameter $D_1$, as shown.

INDUSTRIAL APPLICABILITY

Once housing 10 has been repaired as described herein, it may be shipped for returning to service, either by itself or reassembled or partially reassembled with other components of machine system 8. Reassembling housing into machine system 8 may take place by pressing or shrink fitting bearings 30a and 30b into bores 22 and 19, respectively. Axle 40 may be re-positioned in housing 10 and supported via bearings 30a and 30b. Wheels 42 and 44 may be coupled with axle 40 in a conventional manner, and motor(s) 50 and gearbox 52 coupled with housing 10. This subassembly may then be mounted to frame 46. In some embodiments, housing 10 may be returned to service with the same or identical components with which it was previously used. After another service life, machine system 8 can be disassembled again, and housing 10 once again repaired in anticipation of yet another service life.

The present disclosure thus provides a strategy whereby machine components, such as housing 10, may be prepared for resurfacing and successfully resurfaced to return the component to original specifications. The insight to perform the processing stages set forth herein in a prescribed order, and according to certain process parameters, will enable reliable adhesion of the relatively thin layers of resurfacing material 60a and 60b. By ensuring uniformity in the diameter of bores 22 and 19, a uniform thickness of resurfacing material 60a may be readily provided. Moreover, by pre-machining bores 22 and 19 as shown in FIG. 3 in advance of the processing stage shown in FIG. 4, successful removal of grease 82 can be ensured. Attempting to remove grease 82 in advance of machining bores 22 and 19 to a uniform diameter state is less effective, if at all, as worn material tends to inhibit complete removal of grease 82. In other words, the development of wear regions 26 can actually increase the tendency for grease 82 to be entrapped in corresponding regions of cast material 64. By machining bores 22 and 19 first, then subjecting housing 10 to grease removal processing, a cleaner substrate for application of resurfacing material 60a and 60b is thus made available. This insight enables successful resurfacing and entirely new repair and remanufacturing techniques in an environment where only inferior strategies were previously possible or practicable.

The present description is for illustrative purposes only, and should not be construed to narrow the breadth of the present disclosure in any way. Thus, those skilled in the art will appreciate that various modifications might be made to the presently disclosed embodiments without departing from the full and fair scope of the present disclosure. While much of the foregoing description emphasizes the specific context of machine housing 10, it is emphasized that the present disclosure is not thereby limited. Bearings 30a and 30b are coupled with housing 10 via press fits or shrink fits with resurfacing material 60a and 60b. Other systems, however, which do not rely upon shrink or press fits, yet exhibit similar problems with regard to deeply entrapped grease, might be remanufactured as described herein. Other aspects, features and advantages will be apparent upon an examination of the attached drawings and appended claims.

We claim:

1. A method of repairing a housing for a machine system comprising:
   receiving a housing of cast material removed from service in a machine system that includes at least one bearing bore having a non-uniform inner diameter;
   returning the inner diameter of the at least one bearing bore to a uniform diameter state;
   subsequent to returning the inner diameter to a uniform diameter state, removing deeply entrapped grease from cast material of the housing by heating the housing to a temperature between a flow temperature of the entrapped grease and a metallurgical altering temperature of the cast material of the housing; and
   subsequent to removing deeply entrapped grease, resurfacing the at least one bearing bore with a material different from the cast material of the housing; and
   the resurfacing step includes adhering the different material to the housing.

2. The method of claim 1 wherein:
   returning the inner diameter of the at least one bearing bore to a uniform diameter state includes removing cast surface material of the housing;
   removing deeply entrapped grease includes liquefying grease entrapped within pores of cast material of the housing at least in part by uniformly heating the inner diameter of the at least one bearing bore; and
   resurfacing the at least one bearing bore includes applying a uniformly thick layer of the different material and mechanically bonding the different material with the cast material of the housing.

3. The method of claim 1 wherein:
   receiving a machine housing further comprises receiving a machine housing that includes at least one bearing bore having a length, a diameter greater than its length and an oblong axial cross section along at least a portion of its length; and
   returning the inner diameter of the at least one bearing bore to a uniform diameter state comprises returning the oblong axial cross section of the at least one bearing bore to a circular axial cross section.

4. The method of claim 3 wherein:
   receiving a machine housing further comprises receiving a machine housing having three bores, including a first bearing bore adjacent a first end of the housing, a second bearing bore adjacent a second end of the housing and a third bore extending between and communicating with each of the first and second bearing bores; and
   returning the inner diameter of the at least one bearing bore to a uniform diameter state further comprises truing each of the first and second bearing bores to an axis common to each of the three bores.

5. The method of claim 4 wherein:
   receiving a machine housing further comprises receiving a machine housing having wear regions in at least one of the first and second bearing bores and comprising non-uniform portions thereof;
   returning the inner diameter of the at least one bearing bore to a uniform diameter state further comprises enlarging the diameter of each of the first and second bearing bores relative to a specification diameter; and
   resurfacing the at least one bearing bore comprises reducing the diameter of each of the first and second bearing bores relative to the specification diameter;
   the method further comprising returning the diameter of each of the first and second bearing bores to the specification diameter after resurfacing by removing a portion of the resurfacing material.

6. The method of claim 1 wherein resurfacing the at least one bearing bore further comprises spraying a resurfacing material onto the inner diameter of the at least one bearing bore, the method further comprising removing a portion of the resurfacing material after spraying onto the inner diameter.

7. The method of claim 6 wherein removing deeply entrapped grease from cast material of the housing comprises uniformly heating the inner diameter of the at least one bearing bore by immersing the housing in heated fluid.

8. The method of claim 7 wherein uniformly heating the inner diameter further comprises uniformly heating the inner diameter to a temperature between a flow temperature of entrapped grease and a metallurgical damage temperature of cast material of the housing.

9. The method of claim 8 wherein uniformly heating the inner diameter comprises heating the housing in a furnace to a temperature in a range between 700° F. and 750° F.

10. The method of claim 6 further comprising:
removing a bearing from the at least one bearing bore prior to returning the inner diameter to a uniform diameter state; and
fitting a replacement bearing into the at least one bearing bore subsequent to resurfacing the inner diameter.

11. A method of remanufacturing a machine system comprising:
removing surface material from within at least one bearing bore of a housing for a machine system;
subsequent to removing surface material, removing deeply entrapped grease from a cast material of the housing by heating the housing to a temperature between a flow temperature of the entrapped grease and a metallurgical altering temperature of the cast material of the housing;
subsequent to removing deeply entrapped grease, resurfacing the at least one bearing bore by adding material different from the cast material of the housing and bonded therewith; and
shipping the housing for returning to service in a machine system, subsequent to resurfacing the at least one bearing bore.

12. The method of claim 11 wherein the heating step temperature is in a range between 700 and 750° F.

13. The method of claim 11 wherein removing surface material comprises dry machining the at least one bearing bore, and wherein removing deeply entrapped grease comprises uniformly heating an inner diameter of the at least one bearing bore to a temperature sufficient to liquefy entrapped grease within pores of cast material of the housing.

14. The method of claim 11 further comprising:
disassembling a first bearing and a second bearing from a first bearing bore and a second bearing bore of the housing, respectively, prior to removing surface material; and
truing each of the first and second bearing bores to a common axis via removing surface material from within at least one of the first and second bearing bores.

15. The method of claim 14 wherein:
removing surface material comprises enlarging a diameter of each of the first and second bearing bores relative to a specification diameter;
resurfacing the at least one bearing bore further comprises reducing the diameter of the first and second bearing bores relative to the specification diameter;
the method further comprising returning the diameter of each of the first and second bearing bores to the specification diameter via removing a portion of the resurfacing material, and shrink fitting replacement bearings into each of the first and second bearing bores subsequent to returning the diameter to the specification diameter.

16. The method of claim 11 further comprising:
removing the housing for remanufacturing from a propulsion system of a locomotive; and
reassembling the propulsion system subsequent to resurfacing the at least one bearing bore, including positioning a replacement bearing for journaling a locomotive axle into the resurfaced at least one bearing bore.

17. The method of claim 11 wherein removing surface material from within the at least one bearing bore comprises removing resurfacing material, and wherein shipping the housing for returning to service comprises shipping the housing for returning to service a second time in a machine system.

18. A method of resurfacing a cast metallic component with metal spray coating comprising:
removing external grease present on a surface of the cast metallic component;
removing grease deeply entrapped in pores of the surface of the cast metallic component;
spraying the surface of the cast metallic component with metal spray resurfacing material to bond the resurfacing material therewith; and
machining the metal spray to restore the component to original specifications.

19. The method of claim 18 wherein removing grease includes removing grease in pores in cast surface material of a bearing bore of the housing.

20. The method of claim 19 further comprising:
receiving the housing after service in a machine system;
removing a shrink fitted bearing from within the bearing bore, the bearing bore having a non-uniform inner diameter; and
returning the bearing bore to a uniform diameter state to prepare it for resurfacing, including removing cast surface material of the bearing bore prior to removing grease.

* * * * *